United States Patent
Egan

(10) Patent No.: US 7,016,138 B2
(45) Date of Patent: Mar. 21, 2006

(54) TENSION FEEDBACK SYSTEM FOR A TAPE DRIVE

(75) Inventor: Brian Egan, Thornton, CO (US)

(73) Assignee: Quantum Corporation, San Jose, CA (US)

( * ) Notice: Subject to any disclaimer, the term of this patent is extended or adjusted under 35 U.S.C. 154(b) by 69 days.

(21) Appl. No.: 10/660,891

(22) Filed: Sep. 12, 2003

(65) Prior Publication Data

US 2005/0057843 A1 Mar. 17, 2005

(51) Int. Cl.
*G11B 15/18* (2006.01)
*G11B 5/584* (2006.01)

(52) U.S. Cl. .................................... 360/71; 360/77.12
(58) Field of Classification Search .................. 360/71, 360/77.12
See application file for complete search history.

(56) References Cited

U.S. PATENT DOCUMENTS

| | | | |
|---|---|---|---|
| 5,173,817 A | | 12/1992 | Feinberg |
| 5,481,417 A | | 1/1996 | Yokoyama et al. |
| 5,602,688 A | * | 2/1997 | Yokoyama et al. ........... 360/69 |
| 5,626,304 A | | 5/1997 | Mukai |
| 5,777,823 A | | 7/1998 | Gavit |
| 5,973,872 A | | 10/1999 | Saliba |
| 6,305,629 B1 | * | 10/2001 | Chliwnyj et al. ........ 242/334.3 |
| 6,369,982 B1 | | 4/2002 | Saliba |
| 6,427,934 B1 | | 8/2002 | Saliba et al. |
| 6,563,659 B1 | | 5/2003 | Fasen |

OTHER PUBLICATIONS

Honeywell, (date unknown). "Pressure and Force Sensors: Piezoresistive Technology," Reference and Application Data provided by Honeywell, pp. 101-103.

Honeywell. "FSL05N2C," Datasheet describing the FS Series Sensors, located at <http://catalog.sensing.honeywell.com, last visited on Aug. 10,2003,5 pages total.

Sony Corporation (2000). *Sony Tape Streamer Products*. (27 pages total).

Stahl, K. J. and Gavit, S. E. "Flying and Tracking Stability of ATS Porous Air Bearings," *Draft for Journal of Information Storage and Processing Systems*, located at <X:/web/local/apache/services/xfer/394692BB-4EBE-D370/WhitePaper.doc>, last visited on Jun. 13, 2000 pp. 1-16.

* cited by examiner

*Primary Examiner*—David Hudspeth
*Assistant Examiner*—Mitchell Slavitt
(74) *Attorney, Agent, or Firm*—Morrison & Foerster LLP

(57) ABSTRACT

Tape drive systems and methods for operating tape drive systems are provided. The system includes a head assembly having a head element for reading or writing data to a magnetic tape medium, and a pressure sensor coupled to the head element, the pressure sensor configured to generate a pressure signal representative of a pressure applied by the head element onto the pressure sensor. In some embodiments, an accelerometer is provided for sensing an acceleration of the head assembly and for generating a acceleration signal representative of an acceleration experienced by the head assembly. The method includes passing a tape medium between a take-up reel and a supply reel such that a tension in the tape medium causes the tape medium to apply a pressure onto a head element, and using a pressure sensor to detect a pressure applied by the head element onto the pressure sensor.

20 Claims, 6 Drawing Sheets

TENSION FEEDBACK SYSTEM FOR A TAPE DRIVE

BACKGROUND OF THE INVENTION

Storage subsystems, such as magnetic tape libraries, are widely used for storing information in digital form. Tape storage subsystems typically include one or more tape drives for reading and writing data to removable tape cartridges. FIG. 1 shows a simplified view of an exemplary tape drive 100 having a removable tape cartridge 106 loaded therein. The tape cartridge 106 typically comprises a cartridge housing enclosing a tape medium 110 wound about a rotatable supply reel 108. The tape drive 100 typically includes a take-up reel 101, a plurality of rollers 102, and a read/write head 104. The take-up reel 101 includes a take-up leader that is coupled to a supply leader extending from one end of the tape medium 110, when the tape cartridge 106 is loaded into the tape drive 100. The tape medium 110 typically comprises a thin film of magnetic material which stores the data. To read or write data, the tape medium 110 is spooled between the take-up reel 101 and the supply reel 108, with rollers 102 guiding the tape medium 110 across the read/write head 104. Upon insertion of the tape cartridge 106 into the tape drive 100, the tape medium 110 on the cartridge reel 108 is coupled to the take-up reel 101 of the tape drive 100. Subsequently, prior to removing the tape cartridge 106 from the tape drive 100, the tape medium 110 is rewound onto the cartridge reel 108 and the supply leader is then uncoupled from the take-up leader.

When performing read/write operations on the tape medium 110, it is important to maintain a proper tension in the tape medium 110, in order to maintain effective contact between the read/write head 104 without causing excessive stress on the tape medium 110. As the thicknesses of tape media and the width of data tracks on tape media continue to decrease with new technological improvements, the importance of tension control increases. Tension variation within the tape path may produce spikes in the lateral tape motion (LTM) and can cause unacceptable levels of stress in the edges of the tape medium 110.

BRIEF SUMMARY OF THE INVENTION

In accordance with embodiments of the present invention, a tape drive system is provided. The system comprises a head assembly comprising: a head element for reading or writing data to a magnetic tape medium; and a pressure sensor coupled to the head element, the pressure sensor configured to generate a pressure signal representative of a pressure applied by the head element onto the pressure sensor. In some embodiments, an accelerometer is provided for sensing an acceleration of the head assembly and for generating a acceleration signal representative of an acceleration experienced by the head assembly.

In accordance with other embodiments of the present invention, a method of operating a tape drive system is provided. The method comprises: passing a tape medium between a take-up reel and a supply reel such that a tension in the tape medium causes the tape medium to apply a pressure onto a head element; and using a pressure sensor to detect a pressure applied by the head element onto the pressure sensor.

In accordance with other embodiments of the present invention, a tape drive system is provided. The tape drive system comprises: a take-up reel motor; a supply reel motor; a tape path for a magnetic tape medium; and a pressure sensing assembly provided adjacent the tape path. The pressure sensing assembly comprises: a support; a tape contacting member; and a pressure sensor coupled to the tape contacting member, the pressure sensor configured to generate a pressure signal in response to a compression of the pressure sensor, the signal being representative of a pressure applied by the magnetic tape medium onto the pressure sensing assembly.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

BRIEF DESCRIPTION OF THE SEVERAL VIEWS OF THE DRAWING(S)

In the following description, reference is made to the accompanying drawings which form a part thereof, and which illustrate several embodiments of the present invention. It is understood that other embodiments may be utilized and structural and operational changes may be made without departing from the scope of the present invention. The use of the same reference symbols in different drawings indicates similar or identical items.

DETAILED DESCRIPTION OF THE INVENTION

Figure 1:
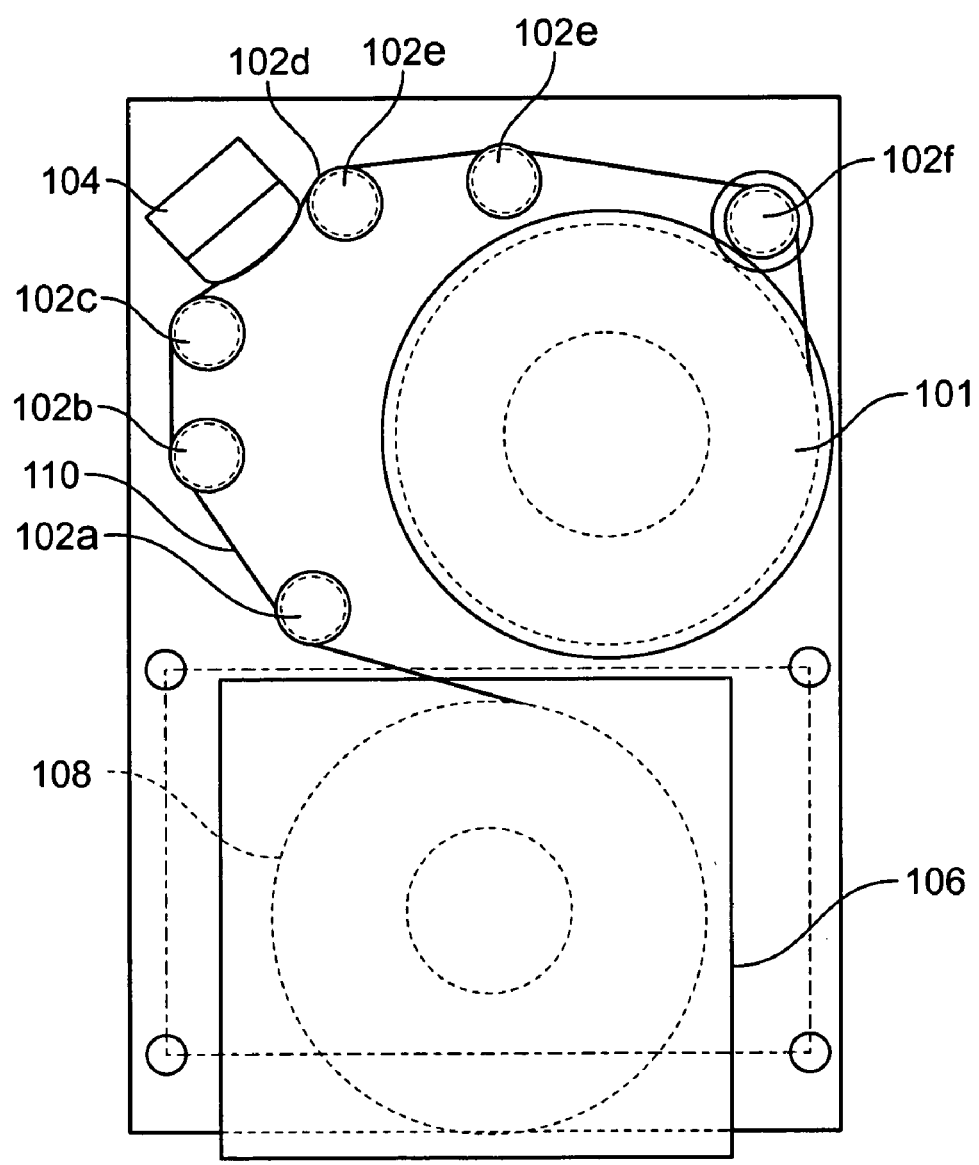
FIG. 1 is a plan view of an exemplary tape drive having a removable tape cartridge loaded therein.
Figure 2:
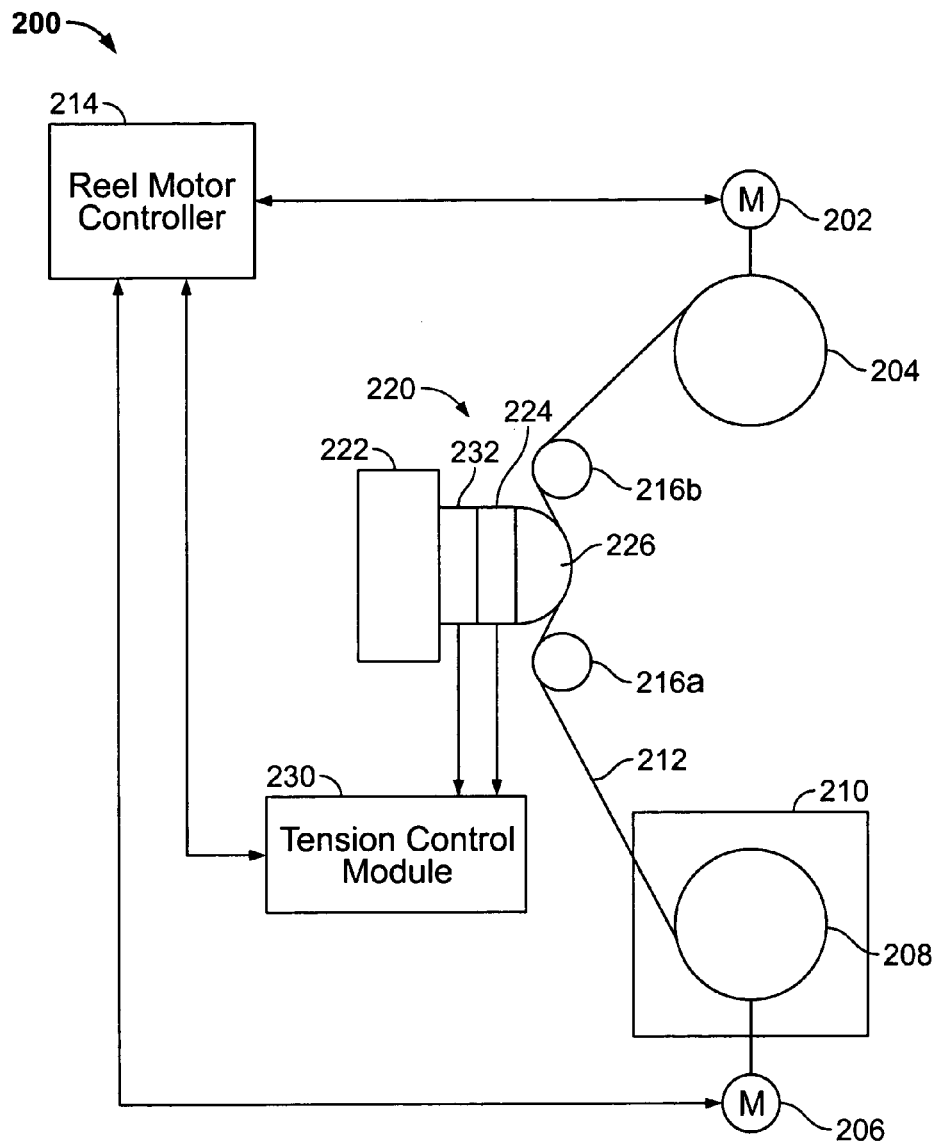
FIG. 2 is a block diagram showing a tape drive system in accordance with embodiments of the present invention.

FIG. 2 is a simplified block diagram showing a tape drive system 200 in accordance with embodiments of the present invention. The tape drive system 200 comprises a take-up reel motor 202 coupled to a take-up reel 204, and a supply reel motor 206 coupled to a supply reel 208. The supply reel 208 is provided within a tape cartridge 210 and has a length of tape medium 212 wrapped around it. When the tape cartridge 210 is loaded into the tape drive system 200, the tape medium 212 is coupled with the take-up leader and then is wrapped around the take-up reel 204. The path that the tape medium 212 travels as it passes from the supply reel 208 to the take-up reel 204 is the tape path. The take-up reel motor 202 and the supply reel motor 206 are controlled by the reel motor controller 214 to rotate the take-up reel 204 and the supply reel 208, respectively, in order to move the tape medium 212 back and forth between the two reels 204, 208.

The tape drive system 200 further comprises a head assembly 220. The head assembly 220 comprises a head support 222 having a pressure sensor 224 and one or more head elements 226 mounted thereon. The pressure sensor 224 may comprise one or more pressure sensing elements, as will be described in greater detail below. A plurality of rollers may be provided along the tape path between the supply reel 208 and the take-up reel 204. In FIG. 2, only a pair of rollers 216a–216b provided on either side of the head assembly 220 are shown. It will be understood, however, that greater or fewer rollers may be used.

As the take-up reel motor 202 rotates the take-up reel 204 in a first direction (shown in FIG. 2 as the clockwise direction), the tape medium 212 is wound about the take-up reel 204, thereby drawing a length of tape medium 212 from the supply reel 208 along the tape path and onto the take-up reel 204. As the supply reel motor 206 rotates the supply reel 208 in a second direction (shown in FIG. 2 as the counter-clockwise direction), the tape medium 212 is rewound about the supply reel 208, thereby unwinding the tape medium 212 from the take-up reel 204 and drawing the tape medium 212 backwards along the tape path. The head assembly 220 is positioned within the tape drive system 200 such that the head element 226 is located adjacent the tape path. The head element 226 can be, e.g., magneto-resistive (MR) read head or a thin film read/write head element, and is positioned adjacent the tape medium 212 such that the head element 226 can read from and/or write data to the tracks on the tape medium 212.

The head assembly 220 may further comprise a head positioning mechanism (not shown), including a stepper motor for rotating a lead screw. The head support 222 may be threadably coupled to the lead screw such that as the lead screw rotates, the head support 222 is translated laterally, relative to the direction of tape movement (also referred to as the transport direction), to position the head element(s) 226 relative to the desired track.

The pressure sensing elements may comprise transducers. A transducer is a device that converts input energy of one form into output energy of another. The transducer can be, for example, a piezoelectric or a piezoresistive material which can be used to produce a signal representative of the pressure being applied onto the pressure sensing element. A piezoelectric material is a material that develops a electric charge when subjected to a force. Piezoelectric materials transform mechanical work input into electrical output and vice versa. Piezoresistive materials change their resistance under physical pressure, so if a piezoresistive material is strained or deflected, the internal resistance of the material will change and will stay changed until the material's original position is restored. A voltage can be applied across the piezoresistive material to detect the change in resistance. In some embodiments, the pressure sensing element may be, for example, a Honeywell Force Sensor model no. FSL05N2C.

The tape drive system 200 may further comprise a tension control module 230, which may be coupled to the pressure sensor 224 and the reel motor controller 214. The tension control module 230 may receive pressure signals from the pressure sensing element(s), and determine whether those pressure signals indicate that the tension in the tape medium 212 passing across the head element 226 exceeds a desired range. The tension control module 230 may further be coupled to the reel motor controller 214 to provide the reel motor controller 214 with instructions or guidance regarding how to adjust the power being provided to either take-up reel motor 202 or supply reel motor 206 in order to achieve the desired tension in the tape medium 212.

Figure 6:
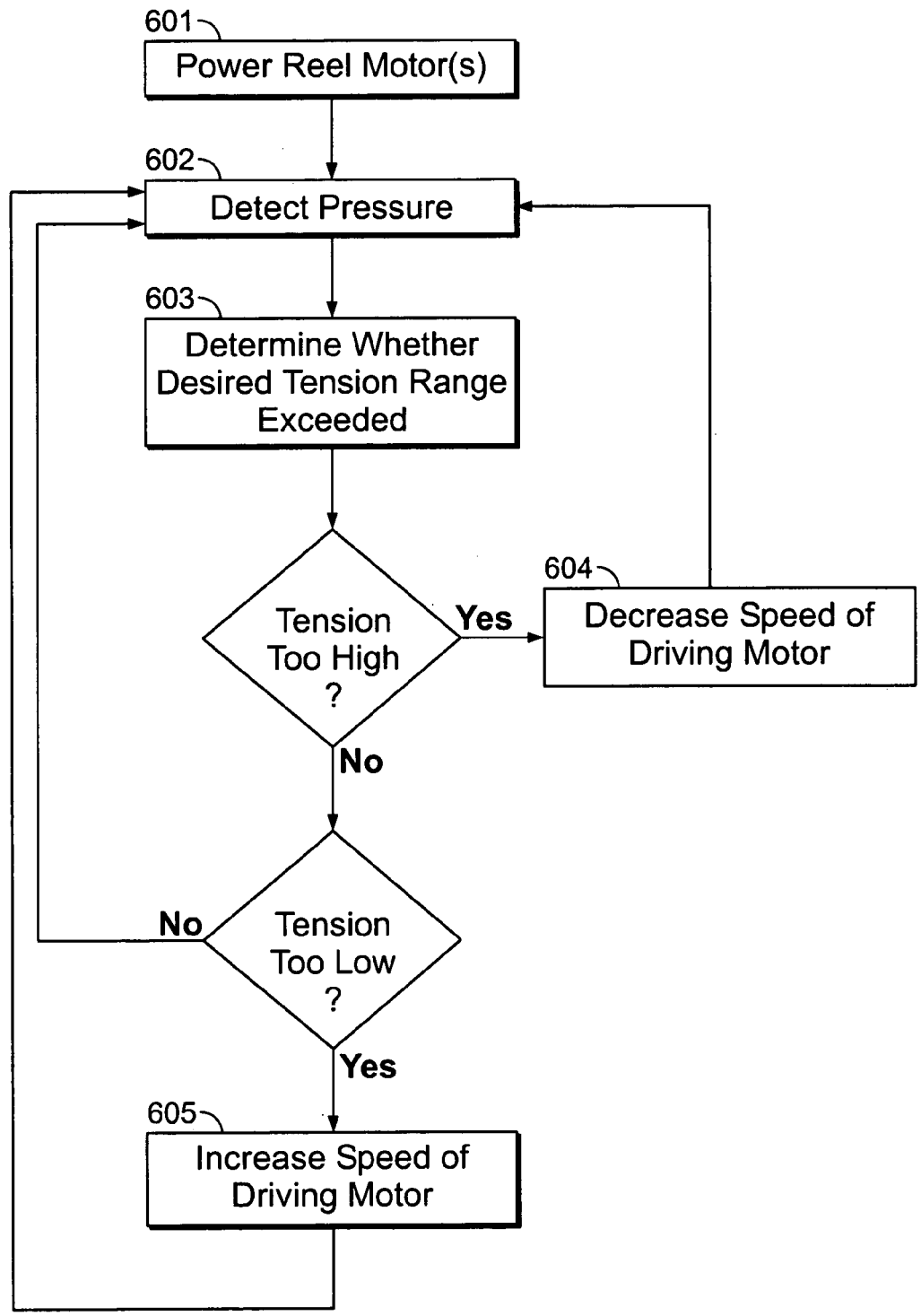
FIG. 6 is a block diagram showing the operation of a tape drive system in accordance with embodiments of the present invention.

A block diagram showing the operation of the tape drive system 200 in accordance with embodiments of the present invention is provided in FIG. 6. In step 601, one or both of the reel motors 202, 206 are powered to rotate the reels 204, 208. As described above, when the take-up reel 204 is driven in the first direction by the reel motor 202, the tape medium 212 is drawn from the tape cartridge 210 along the tape path to be wrapped around the take-up reel 204. When the tape medium 212 is moving in this direction, the take-up reel motor 202 is considered to be the driving motor because the take-up reel motor 202 is driving the movement of the tape medium 212. When the supply reel 208 is driven in the second direction by the supply reel motor 206, the tape medium is drawn from the take-up reel 204 backwards along the tape path to be wound around the supply reel 208. With the tape medium 212 traveling in this backward direction along the tape path, the supply reel motor 206 is the driving motor. In either case, the non-driving motor may provide a variable resistance to the rotation caused by the driving motor. This variable resistance can be controlled in response to feedback from a tachometer roller or the pressure sensor, as described in greater detail below, to provide a desired speed or tension.

As the tape medium 212 travels in either direction along the tape path, there is a tension in the tape medium 212 in the longitudinal transport direction (i.e., the direction of tape travel) which may be caused by the variable resistance from the non-driving motor and friction between the tape medium 212 and other components in the tape drive system 200, such as the rollers 216. In some situations, an eccentricity may be present in one or both of the reels 204, 208. This eccentricity can cause the reel 204, 208 to rotate unevenly or wobble as the tape medium 212 travels along the tape path. This uneven rotation can cause rapid fluctuations in the tension of the tape medium 212.

The tension in the tape medium 212 can also vary at different longitudinal locations along the tape medium 212. For example, the tension in the tape medium 212 between the supply reel 208 and the roller 216a may be different than the tension in the tape medium 212 at the head element 226, which is positioned between rollers 216a and 216b. Therefore, a tension sensor provided at a location somewhere between the supply reel 208 and the first roller 216a may not provide an accurate indication of the tension at the head assembly 220. Because the head assembly 220 is responsible for the reading and writing of data onto the tape medium 212, it is important that the tape medium 212 be properly positioned and under a proper tension as it passes across the head element 226. In accordance with aspects of the present invention, the pressure sensor may be provided as part of the head assembly 220. In other embodiments, the pressure sensor may be provided at different locations within the tape drive system 200.

In the tape drive system 200 shown in FIG. 2, the rollers 216a–216b cause the tape medium 212 to wrap around the head element 226, thereby applying a force onto the head element 226 in a direction perpendicular to a plane defined by the tape medium 212. This force applied by the tape medium 212 onto the head element 226 causes the head element 226 to apply a corresponding force onto the pressure sensor 224. In step 602, the pressure sensor 224 detects the pressure applied by the head element 226 onto the pressure sensor 224. In some cases, a tension differential may exist across the face of the head element 226. This differential may be considered to be negligible, so the pressure sensor 224 is configured to detect the overall pressure applied by the head element 226. In other embodiments, multiple pressure sensors 224 may be used to detect differences in tension across the head element 226.

The pressure sensor 224 then outputs a pressure signal to the tension control module 230. This pressure signal is representative of the pressure applied by the head element 226 onto the pressure sensor 224. The tension control module 230 receives this pressure signal and in step 603, uses this pressure signal to determine whether the tension in the tape medium 212 at the location of the head element 226 exceeds a desired range. If the tension is either higher or lower than the desired range, the tension control module 230 may transmit a tension signal to the reel motor controller 214 instructing the reel motor controller 214 to adjust the rotation of the reel motors 202, 206 to bring the tension in the tape medium 212 into the desired range.

If the tension in the tape medium 212 is too high, then in step 604, the tension control module 230 sends a tension signal to the reel motor controller 214 instructing the reel motor controller 214 to decrease the torque of the driving motor. Alternatively or in addition to decreasing the torque of the driving motor, the reel motor controller 214 may adjust the resistance of the non-driving motor. In yet other embodiments, other components in the tape drive system 202 may be adjusted in order to decrease the tension in the tape medium 212, such as, for example, by adjusting the position or orientation of one or more rollers 216. After the adjustment is executed, the process loops back to step 602, in which the pressure sensor 224 continues to detect the pressure applied by the head element 226.

If the tension in the tape medium 212 is too low, then in step 605, the tension control module 230 sends a tension signal to the reel motor controller 214 instructing the reel motor controller 214 to increase the torque of the driving motor. Alternatively or in addition to increasing the torque of the driving motor, the reel motor controller 214 may increase the resistance of the non-driving motor. Other components in the tape drive system 202 may also be adjusted in order to increase the tension in the tape medium 212. The process then returns again to step 602, in which the pressure is detected by the pressure sensor 224.

This tension detection and adjustment process can be repeated continuously during operation of the tape drive system 200 in order to maintain the desired tension in the tape medium 212. Alternatively, the monitoring process may only be performed while certain functions are being performed, such as, for example, read/write processes.

Various methodologies may be used for determining how the tension control module 230 and reel motor controller 214 control the tension in the tape medium 212. In general, the torque in each reel is determined by an equation that takes into account all of the drags, speeds, desired tension, and radii of the reels. Typically, there are several terms that may be summed in order to determine the total external influences. For instance, due to windage and bearing drag, it is understood that extra current may be required in the driving reel at higher speeds. Accordingly, the control equation may contain a term that is proportional to the speed of the driving reel. This term may be added to other terms that account for the torque required to accelerate the reel, and the torque required to maintain tension at a given radius. The constants in this equation may represent an empirically-determined model of the known dynamics of the tape path. Adding a tension sensor in the tape path can improve the accuracy by fine tuning the torque equation.

Although the pressure sensor 304 can provide an indication of the tension in the tape medium 212, external factors may impact the accuracy of the tension determination. For example, vibrations or other movement of the tape drive system 200 can cause the head element 306 to apply a force onto the pressure sensor 304 in addition to the force caused by the tension in the tape medium 212. This extra force can cause inaccuracies in any tension calculation performed based on the pressure signal from the pressure sensor 304. In accordance with embodiments of the present invention, an accelerometer may be provided as part of the tape drive system 200 for improving the accuracy of the tension calculation.

As shown in FIG. 2, the head assembly 220 may further comprise an accelerometer 232, which can be mounted onto the head support 302. However, in contrast with the pressure sensor 304, which is coupled to both the head support 302 and the head element 306 such that the pressure sensor 304 monitors pressure caused by both tape tension and overall system vibrations, the accelerometer 232 is configured to only monitor movement of the head support 302. Thus, the accelerometer 232 generates an acceleration signal representative of an acceleration experienced by the head support 302, while changes in the tape tension do not affect the acceleration signal.

This acceleration signal is transmitted to the tension control module 230, which processes the acceleration signal with the pressure signal from the pressure sensor 304 to produce a tension signal that is representative of the tension in the tape medium 212. In other words, the tension control module 230 uses the acceleration signal to filter the pressure signal in order to more accurately determine the tension in the tape medium 212, free from the influence of vibrations. If the accelerometer 232 and the pressure sensor 304 are matched so as to produce identical signals in response to identical forces, the production of the tension signal can be performed by subtracting the acceleration signal from the pressure signal. Where the signals are not identical, the tension control module 230 can scale one or both of the signals before subtracting the acceleration signal from the pressure signal in order to achieve the appropriate offset.

As described above, it may be desirable for both the accelerometer 232 and the pressure sensor 304 to be mounted onto the head support 302, in order to ensure that the accelerometer 232 is subjected to the same vibrations as the pressure sensor 304. This can help to produce an acceleration signal that more accurately offsets the affects of vibrations. In some embodiments, the accelerometer 232 and the pressure sensor 304 are incorporated into a single device. For example, the accelerometer 232 and the pressure sensor 304 may both comprise solid state piezoresistive or piezo-electric sensors, which can be provided as a single solid state device. This can reduce the component cost and minimize the size of the head assembly 300. Alternatively, the accelerometer 232 may be mounted elsewhere within the tape drive system 200. This may be desirable in situations where the available space for mounting additional components onto the head support 302 is limited.

Figure 3A:
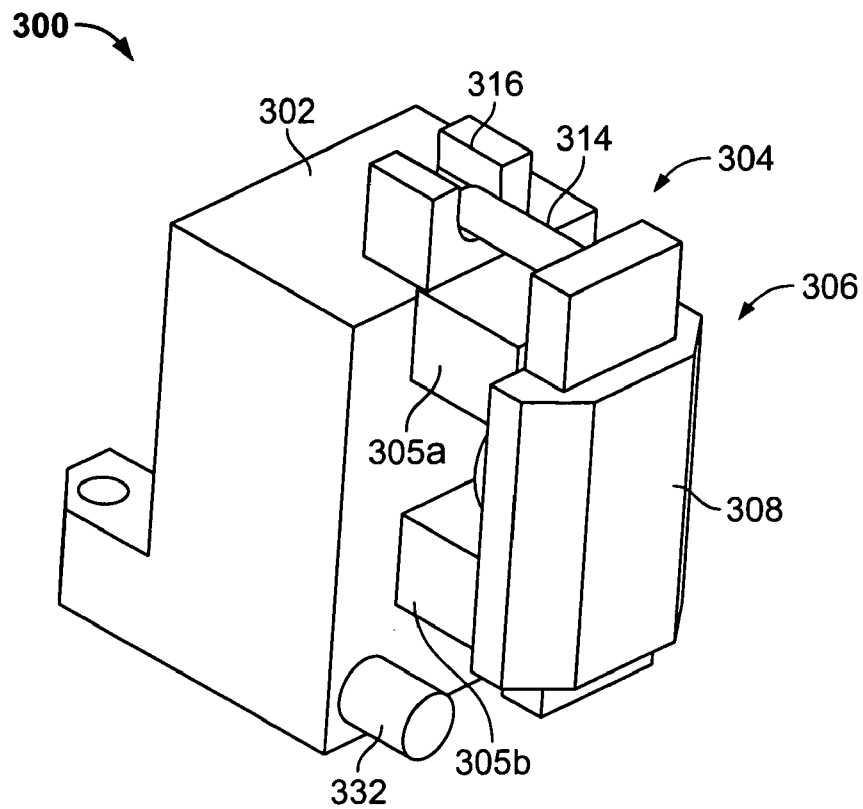
FIGS. 3A–3B are perspective views of a head assembly in accordance with embodiments of the present invention.
Figure 3B:
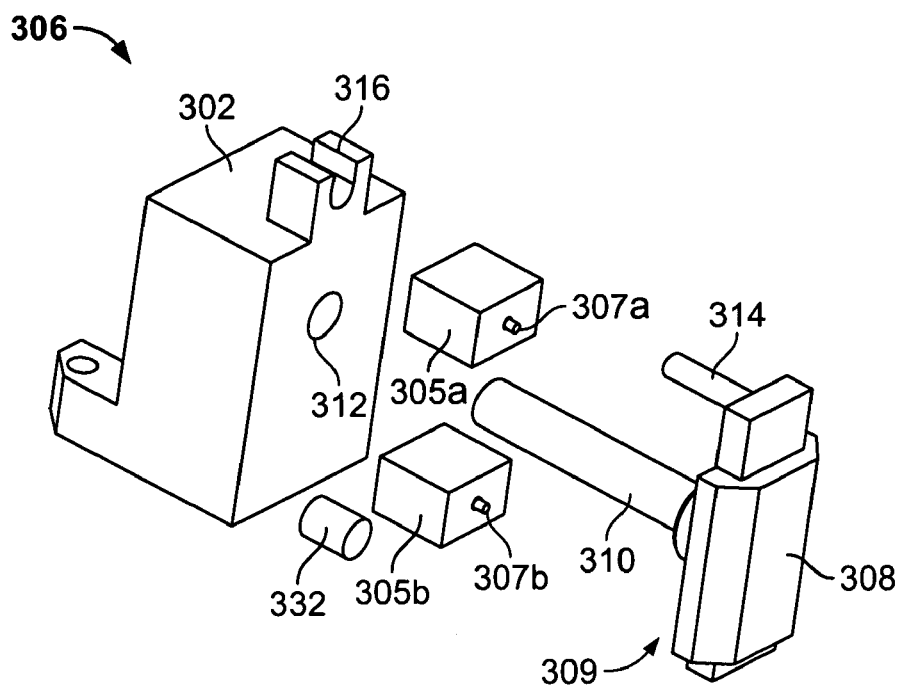

In accordance with embodiments of the present invention, various designs may be used for the head assembly described above. FIG. 3A is a perspective view of one embodiment of a head assembly 300, and FIG. 3B is an exploded perspective view of the head assembly 300. The head assembly 300 comprises a head support 302 having a pressure sensor 304 mounted thereon. In the illustrated embodiment, the pressure sensor 304 comprises a pair of pressure sensing elements 305a–305b, each having contact points 307a–307b, respectively. The contact points 307a–307b are positioned adjacent to the back side of a head element 306 such that the force applied by the head element 306 in the direction of the pressure sensing elements 305a–305b is concentrated onto the two contact points 307a–307b, thereby enabling a complete measurement of the force. The head assembly 300 further comprises an accelerometer 332 mounted to the head support 302.

The head element 306 comprises a front side 308, which can be used to read and/or write data to the tape medium 212, and a back side 309. A guide member 310 and a rotation inhibiting member 314 protrude from the back side 309 of the head element 306 and extend to contact the head support 302. The guide member 310 is received in a guide member receiving portion 312 and the rotation inhibiting member 314 is retained by a flange 316. In the illustrated embodiment, the guide member 310 comprises an elongated round shaft received in an aperture 312. The guide member 310 couples the head element 306 to the head support 302, while enabling the head element 306 to move freely in a primary movement direction perpendicular to a plane defined by the tape medium 212 at the location where it is desired to monitor the tape tension. This direction of movement may be approximately defined by the axis of the guide member 310. The rotation inhibiting member 314 comprises another shaft offset from the guide member 310. When the rotation inhibiting member 314 is coupled with the flange 316, as shown in FIG. 3A, the rotation inhibiting member 314 prevents the head element 306 from rotating about the axis of the guide member 310, while allowing the head element 306 to move in the primary movement direction.

In situations where the tape medium 212 applies a non-uniform force to the head element 306, it may be desired to determine a pressure gradient across the front side 308 of the head element 306. This can be performed by using a plurality of pressure sensing elements 305a–305b, positioned to measure the force applied by the head element 306 at different locations along the back side 309 of the head element 306. In these embodiments, the guide member receiving portion 312 may be sized and/or shaped such that the guide member 310 can move slightly radially about the primary movement direction to accommodate the uneven force upon the head element 306. In other embodiments, the head element 306 may comprise multiple head element components which may be separately movable relative to each other. Each head element component may have one or more pressure sensing elements 305 coupled to it.

Figure 4A:
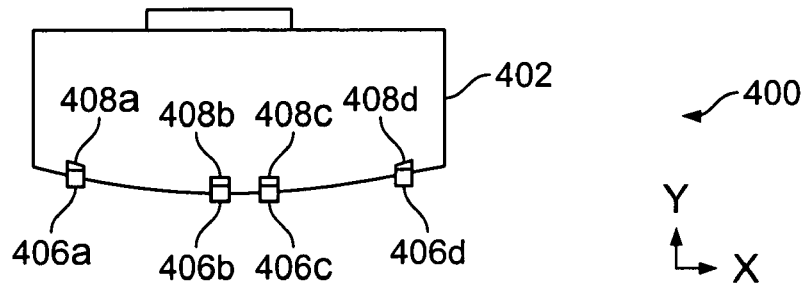
FIGS. 4A–4C show a head assembly in accordance with another embodiment of the present invention.
Figure 4B:
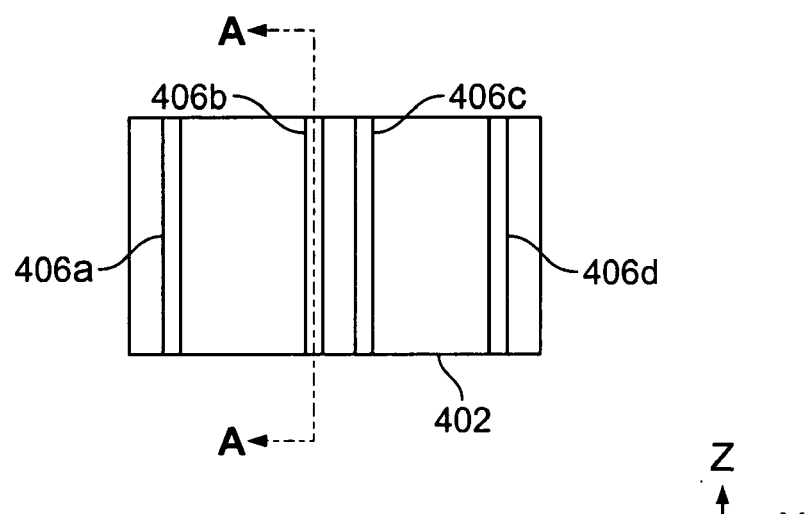
Figure 4C:
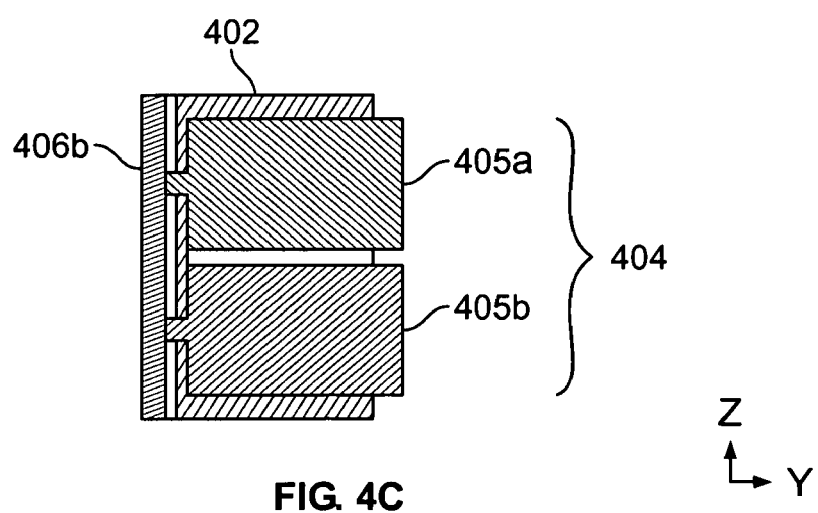

FIGS. 4A–4C show a head assembly 400 in accordance with another embodiment of the present invention. FIG. 4A is a top view, FIG. 4B is a front view, and FIG. 4C is a cross-sectional side view taken along line A—A in FIG. 4B. In this embodiment, there are four head elements 406a–406d mounted in the head support 402. Each of the four head elements 406a–406d is slidably mounted into slots 408a–408d, respectively, such that the head elements 406a–406d can move slightly in the y-direction (as shown in FIG. 4A).

A pressure sensor 404 is provided inside of the head support 402 for sensing the pressure on the head elements 406a–406d. In the embodiment shown, two pressure sensing elements 405 are coupled to each head element 406. In the cross-sectional view provided in FIG. 4C, two pressure sensing elements 405a–405b are shown coupled to head element 406b. This arrangement of pressure sensing elements 405 can enable the pressure sensor 404 to monitor the force applied by the tape medium 212 onto the head element 406 at multiple points in the z-direction. The slots 408a–408d provide a small amount of clearance in the y-direction to allow the head elements 406a–406d to be displaced slightly by the tape medium 212 in that direction and to enable the pressure sensing elements 405 to monitor the force applied by the tape medium 212.

Figure 5:
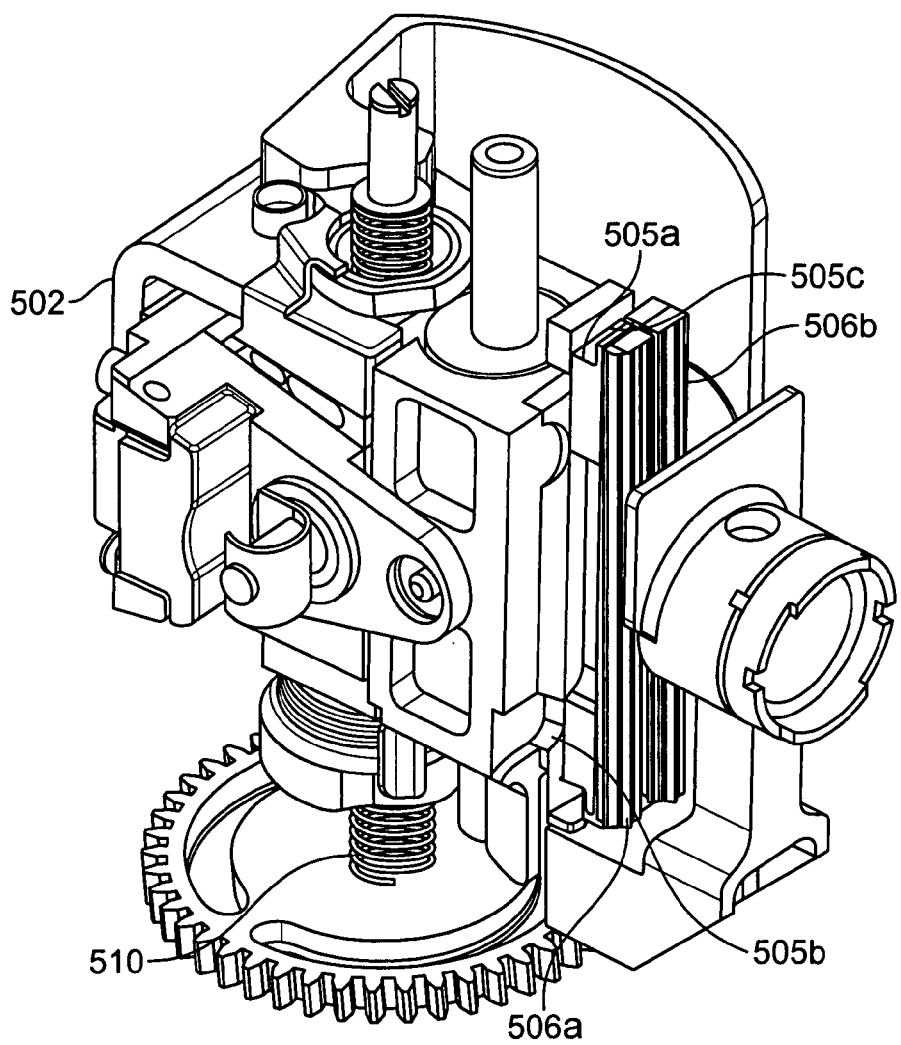
FIG. 5 is a perspective view of another head assembly in accordance with embodiments of the present invention.

FIG. 5 is a perspective view of another head assembly 500 in accordance with other embodiments of the present invention. The head assembly 500 comprises a head support 502 upon which a pressure sensor is mounted. The pressure sensor is comprised of four pressure sensing elements 505a–505d, which are coupled to two vertically oriented head elements 506a–506b. Pressure sensing element 505a is coupled to the top of the head element 506a and pressure sensing element 505b is coupled to the bottom of the head element 506a. Similarly, pressure sensing element 505c is coupled to the top of the head element 506b and pressure sensing element 505d is coupled to the bottom of the head element 506b. A lead screw 510 is provided for positioning the head assembly 500 laterally with respect to the tape medium 212. The operation of the head assembly 500 is similar to the operation described above with respect to head assemblies 300 and 400 above.

It will be appreciated that embodiments of the invention may overcome problems encountered with previous tape drive designs. For example, the incorporation of the pressure sensor into the head assembly as described above may provide a more accurate and relevant tension measurement than measurements taken at different locations along the tape path. Moreover, the compact design of the above-described embodiments may provide the desired tension monitoring without adding a significant degree of complexity to the tape drive design. The pressure sensors described above may also be constructed using extremely small solid state devices and incorporated into the head assembly. This may be preferable to tension monitoring systems incorporating air pressure measurements, as these air pressure systems typically consume a larger volume of space within the tape drive housing and may consume larger amounts of power than the solid state pressure sensors.

The foregoing description of the preferred embodiments of the invention has been presented for the purposes of illustration and description. It is not intended to be exhaustive or to limit the invention to the precise form disclosed. Many modifications and variations are possible in light of the above teaching. For example, in some of the above-described embodiments, two pressure sensing elements are provided for monitoring the force applied by each head element. In other embodiments, fewer or greater numbers of pressure sensing elements may be provided for each head element, depending on the desired resolution of force monitoring.

In addition, it is understood that in some embodiments of the invention, there may be more than one head assembly provided in the tape drive. For example, it may be desired to have one or more head assemblies dedicated to reading and one or more head assemblies dedicated to writing data. Alternatively, two different head assemblies may be provided in the tape drive and be selectively chosen for reading and writing, depending on the type of tape cartridge loaded into the drive. One or more of these head assemblies may incorporate pressure sensors as described above.

As described above, embodiments of the present invention can be used to monitor tension in a magnetic tape medium. It will be understood that other methods of storing data onto a tape medium may be used, and that the invention need not be limited to magnetic storage.

Various systems and modules have been described above for controlling the various components of the tape drive system. It will be understood that although these modules may have been described as logically separate components, the invention may be practiced by performing their functions using a single controller, device, or combination of controllers or devices. For example, in some embodiments, the tension control module 230 and the reel motor controller 214 may be implemented in the firmware of the tape drive's controller and need not be implemented in separate physical locations.

The program logic described herein indicates certain events occurring in a certain order. In alternative implementations, the order of certain logic operations may be varied, modified or removed. Moreover, steps may be added to the above described logic and still conform to the described implementations. Further, operations described herein may occur sequentially or certain operations may be processed in parallel.

It is intended that the scope of the invention be limited not by this detailed description, but rather by the claims appended hereto. The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A tape drive system, comprising:
   a head assembly, comprising:
      a head element for reading or writing data to a magnetic tape medium; and
      a pressure sensor coupled to the head element, the pressure sensor configured to generate a pressure signal representative of a pressure applied by the head element onto the pressure sensor wherein the pressure sensor comprises a plurality of pressure sensing elements positioned to sense a pressure gradient across the head assembly in a lateral direction perpendicular to a direction of tape travel.

2. The tape drive system of claim 1, further comprising:
   a head support, wherein the pressure sensor is coupled to the head support.

3. The tape drive system of claim 2, wherein:
   the head support further comprises a guide member receiving portion; and
   the head element further comprises:
      a front side for contacting the magnetic tape medium;
      a back side opposite the front side; and
      a guide member protruding from the back side of the head element and having a distal end movably positioned in the guide member receiving portion of the head support, such that the head element is movable along an axis defined by the guide member.

4. The tape drive system of claim 3, wherein:
   the head element further comprises a rotation inhibiting member which engages the head support to prevent the head element from rotating about the axis defined by the guide member while enabling the head element to move along the axis defined by the guide member.

5. The tape drive system of claim 3, wherein:
   the pressure sensor is disposed between the head support and the back side of head element.

6. The tape drive system of claim 5, wherein:
   the pressure sensor comprises a first pressure sensing element and a second pressure sensing element, the guide member being positioned between the first and second pressure sensing elements.

7. The tape drive system of claim 1, wherein the head assembly further comprises:
   an accelerometer for sensing an acceleration of the head assembly and for generating a acceleration signal representative of an acceleration experienced by the head assembly.

8. The tape drive system of claim 1, further comprising:
   a take-up reel motor;
   a supply reel motor;
   a motor controller coupled to the take-up reel motor, the supply reel motor, and the pressure sensor, the motor controller being configured to control the rotation of the take-up reel motor and the supply reel motor in response to changes in the pressure signal to maintain a desired tension in a tape medium passing between a take-up reel coupled to the take-up reel motor and a supply reel coupled to the supply reel motor.

9. The tape drive system of claim 8, further comprising:
   an accelerometer for sensing an acceleration of the head assembly and for generating a acceleration signal representative of an acceleration experienced by the head assembly; and
   a tension control module coupled to the pressure sensor and the accelerometer for receiving the pressure signal and the acceleration signal and generating a tension signal representative of a tension in the tape medium;
   wherein the motor controller is coupled to the pressure sensor through the tension control module such that the motor controller controls the rotation of the take-up reel motor and the supply reel motor based upon the tension signal generated by the tension control module.

10. A method of operating a tape drive system, comprising:
    passing a tape medium between a take-up reel and a supply reel such that a tension in the tape medium causes the tape medium to apply a pressure onto a head element;
    using a pressure sensor to detect a pressure applied by the head element onto the pressure sensor; and
    using an accelerometer to detect an acceleration of a head support, the head element being supported by the head support,
    wherein the determining whether the pressure detected by the pressure sensor corresponds with the desired tape medium tension comprises calculating a tension in the tape medium based upon the pressure detected by the pressure sensor and acceleration of the head support detected by the accelerometer.

11. The method of claim 10, further comprising:
    determining whether the pressure detected by the pressure sensor corresponds to a desired tape medium tension; and
    if the pressure detected by the pressure sensor corresponds with an undesired tape medium tension, adjusting the tension of the tape medium.

12. The method of claim 11, wherein the adjusting the tension of the tape medium comprises adjusting a rotational velocity of a take-up reel motor driving the take-up reel or a supply reel motor driving the supply reel.

13. A tape drive system, comprising:
    a take-up reel motor;
    a supply reel motor;
    a tape path for a magnetic tape medium; and
    a pressure sensing assembly provided adjacent the tape path, the pressure sensing assembly comprising:
       a support;
       a tape contacting member; and
       a pressure sensor coupled to the tape contacting member, the pressure sensor configured to generate a pressure signal in response to a compression of the pressure sensor, the signal being representative of a pressure applied by the magnetic tape medium onto the pressure sensing assembly, wherein the pressure sensor comprises one or more pressure sensing elements, each pressure sensing element comprising a transducer for producing the signal representative of the pressure applied by the magnetic tape medium onto the pressure sensing assembly.

14. The tape drive system of claim 13, wherein the pressure sensor is further coupled to the support.

15. The tape drive system of claim 13, further comprising:
a motor controller coupled to the take-up reel motor, the supply reel motor, and the pressure sensing assembly, the motor controller being configured to control the rotation of the take-up reel motor and the supply reel motor in response to changes in the pressure signal to maintain a desired tension in a tape medium passing between a take-up reel coupled to the take-up reel motor and a supply reel coupled to the supply reel motor.

16. The tape drive system of claim 13, wherein:
the pressure sensing assembly comprises a head assembly;
the tape contacting member comprises a head element; and
the support comprises a head support.

17. A tape drive system, comprising:
a head assembly, comprising:
a head element for reading or writing data to a magnetic tape medium;
a pressure sensor coupled to the head element, the pressure sensor configured to generate a pressure signal representative of a pressure applied by the head element onto the pressure sensor;
a take-up reel motor;
a supply reel motor; and
a motor controller coupled to the take-up reel motor, the supply reel motor, and the pressure sensor, the motor controller being configured to control the rotation of the take-up reel motor and the supply reel motor in response to changes in the pressure signal to maintain a desired tension in a tape medium passing between a take-up reel coupled to the take-up reel motor and a supply reel coupled to the supply reel motor.

18. The tape drive system of claim 17, wherein the pressure sensor comprises a plurality of pressure sensing elements.

19. The tape drive system of claim 18, wherein the plurality of pressure sensing elements are positioned to sense a pressure gradient across the head assembly in a lateral direction perpendicular to a direction of tape travel.

20. The tape drive system of claim 17, further comprising:
an accelerometer for sensing an acceleration of the head assembly and for generating a acceleration signal representative of an acceleration experienced by the head assembly; and
a tension control module coupled to the pressure sensor and the accelerometer for receiving the pressure signal and the acceleration signal and generating a tension signal representative of a tension in the tape medium;
wherein the motor controller is coupled to the pressure sensor through the
tension control module such that the motor controller controls the rotation of
the take-up reel motor and the supply reel motor based upon the tension
signal generated by the tension control module.

* * * * *